(12) United States Patent
Wagner

(10) Patent No.: US 8,852,699 B2
(45) Date of Patent: Oct. 7, 2014

(54) METHOD OF FABRICATING A GLASS CONTAINER, AND A CORRESPONDING CONTAINER

(75) Inventor: Christophe Wagner, Neuville les Dieppe (FR)

(73) Assignee: SGD S.A., Puteaux (FR)

( * ) Notice: Subject to any disclaimer, the term of this patent is extended or adjusted under 35 U.S.C. 154(b) by 761 days.

(21) Appl. No.: 12/735,477

(22) PCT Filed: Apr. 2, 2010

(86) PCT No.: PCT/FR2010/050648

§ 371 (c)(1),
(2), (4) Date: Jan. 18, 2011

(87) PCT Pub. No.: WO2010/112792

PCT Pub. Date: Oct. 7, 2010

(65) Prior Publication Data

US 2011/0100858 A1 May 5, 2011

(30) Foreign Application Priority Data

Apr. 3, 2009 (FR) ..................................... 09 52201

(51) Int. Cl.
| | |
|---|---|
| *C03C 17/02* | (2006.01) |
| *C03C 1/00* | (2006.01) |
| *B05D 7/22* | (2006.01) |
| *B05D 1/02* | (2006.01) |
| *A47G 19/22* | (2006.01) |
| *B28B 11/00* | (2006.01) |
| *B28B 21/00* | (2006.01) |
| *B28B 21/72* | (2006.01) |
| *B05B 7/22* | (2006.01) |

(52) U.S. Cl.
CPC ................. *C03C 17/02* (2013.01); *B28B 11/00* (2013.01); *B05B 7/22* (2013.01); *C03C 1/00* (2013.01); *A47G 19/22* (2013.01); *B28B 21/72* (2013.01); *B05D 1/02* (2013.01); *B28B 21/00* (2013.01); *C03C 1/008* (2013.01); *C03C 2218/113* (2013.01); *C03C 2218/31* (2013.01)
USPC ......... 428/34.4; 427/230; 427/236; 206/524.6

(58) Field of Classification Search
CPC ............ C03C 17/02; C03C 1/00; B05D 7/22; B05D 1/02; A47G 19/22; B28B 11/00; B28B 21/00; B28B 21/72
USPC ................. 206/524.6; 427/230, 236; 428/34.4
See application file for complete search history.

(56) References Cited

FOREIGN PATENT DOCUMENTS

| EP | 0294830 A1 | 12/1988 |
|---|---|---|
| WO | WO 2006/054227 A2 | 5/2005 |
| WO | WO 2009/019729 A1 | 2/2009 |

OTHER PUBLICATIONS

English Translation of International Search Report mailed Jun. 8, 2010 in connection with PCT International Application No. PCT/FR2010/050648, filed Apr. 2, 2010.

(Continued)

*Primary Examiner* — Michael C Miggins
(74) *Attorney, Agent, or Firm* — John P. White; Cooper & Dunham LLP

(57) ABSTRACT

The invention relates to a method of fabricating a container (1) comprising a glass wall (2) defining a reception cavity for receiving a composition for administration to a human being or to an animal, said glass wall (2) presenting an inside face situated facing said reception cavity, said method being characterized in that it comprises a step of covering at least a fraction of said inside face in a vitreous material covers said fraction of the inside face at a mass per unit area that does not exceed substantially 70 g/m². The invention relates to glass containers.

29 Claims, 1 Drawing Sheet

(56) References Cited

OTHER PUBLICATIONS

English Translation of Written Opinion of the International Searching Authority mailed Nov. 1, 2011 in connection with PCT International Application No. PCT/FR2010/050648, filed Apr. 2, 2010.

English Translation of International Preliminary Report on Patentability Chapter I mailed Nov. 1, 2011 in connection with PCT International Application No. PCT/FR2010/050648, filed Apr. 2, 2010.

Walther et al. "Packing of Sensitive Parenteral Drugs in Glass Containers with a Quartz-Like Surface" Pharmaceutical Technology Europe, 1996, vol. 8, No. 5, pp. 22 and 24-27.

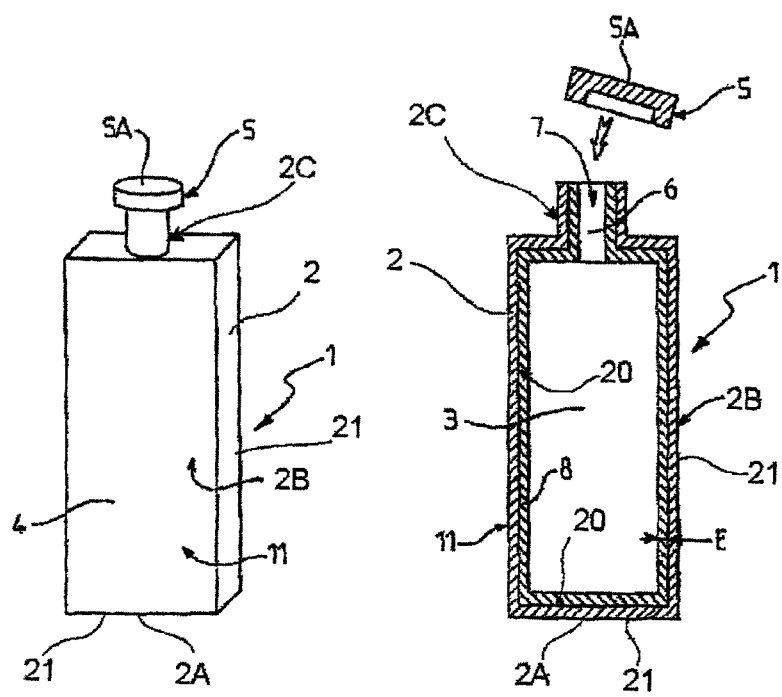

METHOD OF FABRICATING A GLASS CONTAINER, AND A CORRESPONDING CONTAINER

This application is a §371 national stage of PCT International Application No. PCT/FR2010/050648, filed Apr. 2, 2010, and claims priority of French Patent Application No. FR-0952201, filed Apr. 3, 2009, the contents of each of which are hereby incorporated by reference into this application.

TECHNICAL FIELD

The present invention relates to the general technical field of hollow bodies provided with a glass surface and usable in various industrial sectors, in particular in the packaging sector (glass containers, such as bottles or jars, for containing a substance that is liquid or pasty, such as for example a cosmetic or a pharmaceutical). The invention also relates to the technical field of treating glass containers, for functional and/or decorative purposes, and in particular in the cosmetics, pharmaceuticals, or food sectors.

The invention relates more particularly to a method of fabricating a container having a glass wall defining a reception cavity for receiving a composition for administration to a human being or to an animal.

The invention also relates to a container having a wall made of glass that defines a reception cavity for receiving a composition for administration to a human being or to an animal.

PRIOR ART

It is known to have recourse to glass containers for containing liquid compositions, in particular in the cosmetics, pharmaceuticals, or food industrial sectors. In particular, the use of glass for making liquid fragrance containers is particularly valued given the noble nature generally attributed to glass by consumers, and given the objective qualities of this material in terms of transparency, robustness, and mechanical and chemical stability. That is why all or nearly all liquid body fragrances, and in particular top-of-the-range perfumes, are contained in bottles made of glass. The appearance qualities of a perfume bottle are also extremely important for the overall commercial attractiveness of a fragrance. On these lines, it is therefore found essential to make available a perfume bottle of appearance that is very clearly different from that of the bottles of the competition, and that presents a nature that is particularly attractive and value-enhancing for the fragrance contained in the bottle.

Nevertheless, this task is made difficult for two main reasons.

The first of these reasons stems from the fact that, by its very nature, glass is a material that is singularly difficult to work and to decorate under economically acceptable conditions, even though that is essential in consumer sectors such as the perfumery sector.

The second reason relates to the environment to which the glass constituting perfume bottles is subjected and to the general context in which such bottles are used. In particular, the inside of a perfume bottle is in direct contact with the fragrance itself, which is normally constituted by an alcohol-based liquid. This means that any decoration placed on the inside surface of the bottle, so as to be made visible to the consumer on the outside by transparency, must itself be capable of being immersed continuously and over the long term in such an alcohol-based solution, without crumbling, breaking up, decomposing, or dissolving, and that constitutes a genuine technical challenge.

In addition to the catastrophic effects in terms of image that could arise as a result of decoration inside the bottle deteriorating due to being immersed in the liquid fragrance for a long time, such deterioration could also give rise to health problems, insofar as the composition of the fragrance would be modified and would contain a more or less dispersed phase of material that previously constituted the decoration on the inside surface of the bottle.

Thus, although it is extremely advantageous, at least for reasons of appearance, to decorate the inside surface of a glass bottle so as to be visible from the outside by transparency, such inside decoration is found to be extremely difficult to perform in practice, given the aggressivity of the surrounding alcohol-based medium and the difficulty of making a coating hold fast on a substrate made of glass.

SUMMARY OF THE INVENTION

The object given to the invention consequently seeks to provide a remedy to the difficulties set out above and to provide a novel method of fabricating a container having a glass wall, which method makes it possible to obtain a container that, while being particularly attractive from an appearance point of view, also presents excellent hydrolytic durability and is also particularly safe for the user.

Another object of the invention seeks to propose a novel method of fabricating a container having a glass wall, which method makes it possible to obtain a container of particularly pleasing appearance and that is durable in use, both from a mechanical point of view and from a chemical point of view, while being entirely safe from a health point of view.

Another object of the invention seeks to propose a novel method of fabricating a container having a glass wall, which method is suitable for being implemented industrially.

Another object of the invention seeks to propose a novel method of fabricating a container having a glass wall, which method makes it possible to impart specific properties to said container in a manner that is particularly stable and safe.

Another object of the invention seeks to propose a novel method of fabricating a container having a glass wall, which method makes it possible to obtain a bottle that presents an appearance that is excellent, without any visible defect.

Another object of the invention seeks to propose a novel method of fabricating a container having a glass wall, which method makes it possible to obtain a container having improved properties in a manner that is particularly fast and inexpensive.

Another object of the invention seeks to propose a novel method of fabricating a container having a glass wall, which method makes it possible to obtain a container capable of receiving a fluid substance in a manner that is stable and durable, and in particular a fluid substance that is relatively aggressive from a chemical point of view.

Another object of the invention is to propose a novel container having a glass wall, which container is not only particularly attractive from an appearance point of view, but that is also particularly safe in use for the user.

Another object of the invention is to propose a novel container having a glass wall, which container is particularly pleasing in appearance and resistant to being used, both from a mechanical point of view and from a chemical point of view, while being completely safe from a health point of view.

Another object of the invention is to propose a novel container having a glass wall, which container is suitable for being produced industrially.

The objects given to the invention are achieved with the help of a method of fabricating a container comprising a glass wall defining a reception cavity for receiving a composition for administration to a human being or to an animal, said glass wall presenting an inside face situated facing said reception cavity, said method being characterized in that it comprises a step of covering at least a fraction of said inside face in a vitreous material prepared using a sol-gel process so that said vitreous material covers said fraction of the inside face at a mass per unit area that does not exceed substantially 70 grams per square meter (g/m$^2$).

The objects given to the invention are also achieved with the help of a container comprising a glass wall defining a reception cavity for receiving a composition for administration to a human being or to an animal, said glass wall presenting an inside face situated facing said reception cavity, the container being characterized in that at least a fraction of said inside face is covered in a vitreous material prepared using a sol-gel process, said vitreous material covering said fraction of the inside face at a mass per unit area that does not exceed substantially 70 g/m$^2$.

BRIEF DESCRIPTION OF THE DRAWING

Other objects and advantages of the invention appear more clearly on reading the following description and with the help of the accompanying drawing, given purely by way of non-limiting illustration, and in which:

FIG. 1 is a diagrammatic perspective view showing a container in accordance with the invention, constituted in this example by a bottle that is to receive a liquid body fragrance, said bottle being closed by a stopper; and FIG. 2 is a diagrammatic section view showing the FIG. 1 bottle when open.

BEST MANNER OF PERFORMING THE INVENTION

The invention relates to a method of fabricating a container 1 having a glass wall 2 that defines a reception cavity 3 for receiving a composition for administration to a human being or to an animal.

The term "administration" should be understood broadly herein, i.e. it may cover application of the composition by any approach or by any means, which composition may, for example, be applied to the skin, to a mucous membrane, or to hair or nails (cosmetics, pharmaceuticals, etc.), or may be ingested (food, medicine, etc.). In preferred manner, the container 1 is designed to contain in its cavity 3 a substance that is liquid or pasty, and for example an alcohol-based liquid such as a body fragrance. Under such circumstances, the container 1 is advantageously designed to be closed by a closure member 5, constituted by a stopper 5A, for example.

In the preferred variant shown in the figures, the container 1 is a bottle intended to receive a body fragrance. In this preferred embodiment, the method in accordance with the invention thus consists in a method of fabricating a bottle that is to contain a liquid or pasty cosmetic substance, and preferably an alcohol-based liquid fragrance constituted for the most part by ethanol, and preferably comprising at least 90% ethanol. Nevertheless, it is entirely possible to envisage that the method in accordance with the invention constitutes a method of fabricating a bottle for receiving a substance other than a cosmetic, for example a pharmaceutical substance, such as a medicine. Other applications, other than cosmetics or pharmaceuticals, may naturally also be envisaged. Below, for reasons of simplicity in description, a detailed description is given solely of fabricating a perfume bottle, in purely illustrative and non-limiting manner.

The method in accordance with the invention comprises initially a step of supplying, or of fabricating by any known means, a container 1 comprising a glass wall 2 that defines a reception cavity 3 for receiving the composition for administration. The term "glass" should be understood herein in its conventional meaning, and thus specifies a mineral glass, and preferably a silica glass. Preferably, the glass constituting the wall 2 is glass that is white and transparent, e.g. a soda-lime glass or a boro-silicate glass. Advantageously, and for reasons that are set out below, the glass constituting the wall 2 is not a crystal glass nor is it a lead glass, i.e. it presents a lead content that is low or substantially zero, e.g. less than 20%, and preferably less than 10%. Advantageously, the container 1 is made as a single piece that is made completely out of glass. Under such circumstances, the glass wall 2 is closed by a glass bottom 2A, a glass side wall 2B that rises from the periphery of said glass bottom 2A, and a neck 2C that closes the bottle while leaving a filler/dispenser opening 7 that enables the cavity 3 to be put into communication with the outside.

Preferably, and as mentioned above, the opening 7 co-operates with a closure member 5 that is preferably constituted by a stopper 5A, in order to close the bottle. The manner in which such a glass bottle is obtained is well known, and may be performed using any conventional glass-making method.

As shown in the figures, the glass wall 2 presents an inside face 20 facing the reception cavity 3, and an opposite, outside face 21. The glass wall 2 thus forms an empty hollow body having its inside face 20 directly defining the cavity 3, which cavity forms an empty inside volume that is closed completely, except for the opening 7 that leads to the outside and that is of a section that is small compared with the mean section of the cavity 3, as shown in FIG. 2. Such a configuration is characteristic of a bottle having a neck, i.e. a narrow outlet serving to put the inside of the bottle into communication with the outside.

The method also includes a step of covering at least a fraction of said glass wall 2, and more precisely at least a fraction of said inside face 20, in a vitreous material 8 that is made using a sol-gel process. Sol-gel processes are themselves well known. They enable vitreous materials to be obtained that are identical or similar to glass, and in particular to silica glass, without having recourse to melting, merely by polymerizing molecular precursors.

Having recourse to a sol-gel process for coating the glass wall 2 of a container designed to contain a composition for administration to a human being or to an animal is particularly advantageous, in particular for the following three reasons:

1) It serves to solve problems of affinity with glass, that generally render any attempt at depositing a coating on the surface of a glass wall extremely difficult. Sol-gel processes enable vitreous materials to be obtained of a nature that is similar or even identical to that of the glass wall 2 of the container, such that there then exists a strong affinity and total compatibility between the covering vitreous material and the substrate formed by the glass wall 2. This affinity provides excellent strength for the covering vitreous material 8, thus leading to a container being obtained that is robust in use, with a coating that does not break off in use.

2) A container is hollow by nature, such that its wall 2, specifically its glass wall, forms a complex skew surface that is difficult to cover, particularly for a bottle that has a neck that restricts access to the cavity 3. Implementing a sol-gel process enables this drawback to be overcome, insofar as it is based on using materials that are initially in solution, thus facilitating covering operations.

3) Finally, having recourse to a sol-gel process makes it possible, in an industrial setting, to benefit very simply from a large number of varied decorative and/or functional effects that make it possible to make the bottle particularly attractive from an appearance point of view and from a functional point of view. For this purpose, the glass wall 2 is advantageously translucent or transparent, so that the vitreous material 8 is visible from the outside.

As mentioned above, the fraction of the glass wall 2 that is covered by said vitreous material 8 during the covering step forms part of the inside face 20 of the wall 2. In other words, the vitreous material 8 covers, and preferably covers directly, at least the inside surface of the bottle, which surface directly defines the cavity 3.

The covering step is carried out in such a manner that the vitreous material 8 covers said fraction of the inside face 20 with a mass per unit area that does not significantly exceed 70 $g/m^2$, and that preferably lies in the range substantially 30 $g/m^2$ to 60 $g/m^2$, and even more preferably in the range substantially 40 $g/m^2$ to 60 $g/m^2$, for example being equal to about 50 $g/m^2$.

Using a vitreous material 8 at such a mass per unit area enables an excellent protective effect to be obtained, in particular a hydrolytic protection effect, for the glass wall 2, while enabling remarkable appearance effects to be obtained, e.g. by including pigments that are dispersed within the vitreous material 8. The vitreous material 8 may thus present a color that is opaque, transparent, or translucent. The above-mentioned ranges of masses per unit area also make it possible to limit and even substantially prevent any possible cracking phenomenon in the sol-gel layer that forms the material 8. Advantageously, prior to the covering step, the method includes a step of preparing a substantially uniform and liquid sol by mixing together at least the following substances:

a precursor provided with alkoxy groups;
an alcohol solvent for said precursor; and
water.

By way of example, the sol contains at least one inorganic matrix precursor, e.g. a silicon precursor (e.g. a silicon alkoxyde), making it possible to obtain an inorganic lattice, such as a silica lattice, for example. It is also possible to envisage the sol containing at least one precursor for a hybrid matrix (a mixed organic-inorganic precursor), such as for example an organo-alkoxysilane, making it possible to obtain an organo-inorganic lattice, e.g. a silica lattice having organic functions that remain fastened thereto. It is also possible to envisage including precursors of metal, e.g. a precursor of aluminum. Various molecular precursors may be mixed together in order to obtain the sol, with the choice of precursor being made in particular on the basis of the properties expected of the vitreous material 8, of its content in functional substances (pigments, colorants, etc.), and of the natures of said functional substances. Thus, the invention relates to a vitreous material 8 that comprises in particular an inorganic lattice and/or a (hybrid) organo-inorganic lattice, and/or a mixed hybrid lattice (incorporating a metal, such as aluminum).

Advantageously, said substances that are mixed together to obtain said sol also include one or more functional substances selected from the following group: colorants, microbiocidal agents, medicines.

For example, in a preferred embodiment, in which it is desired to decorate a glass bottle, the sol is advantageously formed by a liquid solution containing:

a precursor provided with alkoxy groups;
an alcohol-based solvent for said precursor;
a colorant, e.g. constituted by pigments dispersed in the solution; and
water.

For example, said colorant comprises inorganic pigments, e.g. combined with precursors of the inorganic or hybrid or mixed hybrid lattice, so as to obtain an inorganic or hybrid or mixed hybrid lattice in which inorganic pigments are incorporated. It is entirely possible to envisage having recourse to organic dyes or pigments combined with hybrid or mixed hybrid lattice precursors so as to obtain a hybrid or mixed hybrid lattice in which said organic dyes or pigments are incorporated.

In other applications, in particular in pharmaceutical applications, instead of having a colorant, the sol may rather include an active substance such as a microbiocidal agent making it possible to preserve or even improve the sanitary qualities of the composition that is to be contained in the bottle.

Advantageously, the vitreous material 8 covering the inside face 20 is porous, i.e. it provides substantially no barrier effect against migration suitable for preventing untimely migration into the content of the container 1 of substances either contained in the glass wall 2 or else present between the glass wall and the material layer 8 (e.g. in the form of a coloring layer). The porous nature of the material 8 is nevertheless associated with absence of leaching of the molecules constituting said material 8. It is thus advantageous to deposit (by a sol-gel process) directly on the bare glass of the inside face 20 a vitreous material 8 that, although porous, nevertheless incorporates a dispersion of pigments (inorganic or organic) that are captured in a stable and permanent manner in the molecular lattice of the material 8, said pigments thus not being capable of migrating into the content of the container 1. Under such circumstances, it is preferable for the glass constituting the wall 2 not to be a lead glass, since the vitreous material 8, as a result of its porous nature, would not constitute any kind of barrier preventing unwanted migration of lead into the content.

Advantageously, the method in accordance with the invention includes, before the covering step, a step of rinsing the glass wall 2, which step is performed for example using distilled water, so as to obtain sufficient cleanliness of the glass wall 2, thereby enabling the covering step to be performed subsequently under good conditions.

Prior to the covering step, the method may also include a step of activating said fraction of the glass wall 2, so as to facilitate bonding of the sol to said fraction of the glass wall 2. By way of example, this activation step may consist in chemical activation using an acid (of the HCl type) or a base (of the sodium hydroxide type).

Advantageously, the covering step is implemented while the fraction of the glass wall 2 lies at a temperature that lies substantially in the range 18° C. to 200° C. Preferably, the covering step is implemented while said fraction of the glass wall 2 is at ambient temperature (about 20° C.), thereby making energy savings possible. Nevertheless, depending on the sol-gel process is implemented, it may be advantageous to heat the container, and thus the glass wall 2, so as to improve the conditions under which the sol-gel process is performed, and in particular the retention of the sol on the glass wall 2.

Advantageously, the covering step includes an operation of depositing a layer of sol on said fraction of the glass wall 2, preferably onto the bare glass, while said sol is in a substantially liquid state. In other words, the wall 2, and more precisely the inside face 20, is varnished with the sol. Advantageously, the deposition operation consists in depositing the layer of sol directly on the fraction of the inside face 20, i.e. on the bare glass forming the inside face 20.

This deposition of the sol in the liquid state enables the fraction of the glass wall 2 (and preferably substantially all of the glass wall) to be covered in a manner that is particularly simple and uniform, given the fluidity of the sol, even when said wall 2 presents a shape that is complex and/or is situated inside the container 1. Thus, the method is then particularly well adapted to cover the inside of the container, i.e. the inside face 20 of the glass wall 2, as shown in FIG. 2. Naturally, the invention is absolutely not limited to covering the inside face 20, and it is entirely possible to envisage that the outside face 21 is also coated, or that only the outside face 21 is coated.

Advantageously, the operation of depositing the sol layer is carried out in such a manner as to deposit said layer of said sol on said fraction of the inside face 20 at a mass per unit area that does not significantly exceed 100 $g/m^2$. Using such a mass per unit area makes it possible to optimize the behavior of the sol during subsequent steps of gelling and drying as described below, and to avoid in particular any cracking of the coating. Preferably, the deposition operation is performed so as to deposit said layer of said sol at a mass per unit area that preferably lies substantially in the range 50 $g/m^2$ to 100 $g/m^2$, and more preferably in the range substantially 70 $g/m^2$ to 90 $g/m^2$, thus making it possible to obtain excellent stability during the drying operation as described below. In a particularly preferred embodiment, the deposition operation is performed in such a manner as to deposit said layer of said sol at a mass per unit area of about 85 $g/m^2$. Such a mass per unit area makes it possible, in particular when it is implemented on the inside face 20 of a perfume bottle made entirely out of glass and having a content that is substantially equal to 130 milliliters (mL), to obtain, at the end of the method, a coating that is extremely uniform and free from defects (cracking).

Advantageously, said operation of depositing the sol on the fraction of the glass wall 2 comprises spraying said sol against said fraction of the inside face 20. In other words, the sol is sprayed against the glass wall 2, and more precisely against its inside face 20, in the form of fine droplets. By way of example, such spraying may be performed using a spray nozzle that is inserted into the reception cavity 3 of the container 1 (e.g. via the opening 7), with the container 1 and the nozzle being caused to move relative to each other in rotation and in translation so that the sol solution is sprayed uniformly over the entire inside surface (inside face 20) of the container 1 that is to be treated. Putting the glass wall 2 into contact with the sol by spraying the sol is particularly advantageous since it enables industrialized treatment to be fast with a much smaller quantity of sol being used than would be required if any other method of putting it into contact with the wall were to be implemented. Nevertheless, as an alternative, it is entirely possible to envisage that said deposition operation involves not spraying the sol but filling the cavity 3 with the sol, and then emptying the cavity 3 so that a film of sol remains on the glass wall 2. Other conventional deposition methods may also be implemented, with spraying nevertheless being preferred for the reasons mentioned above.

In the preferred implementation where the deposition operation comprises spraying the sol, as mentioned above, the retention of the sol on the glass wall 2 depends mainly on the following parameters:

the temperature of the glass wall 2, e.g. lying in the range 18° C. to 200° C., and preferably at ambient temperature;

the speed of relative rotation between the spray nozzle and the bottle;

the spraying pressure;

the orientation of the jet produced by the nozzle; and the rate at which the nozzle sprays.

By acting on those parameters, it is possible to obtain a deposit of sol that is uniform, that bonds well with the glass wall 2, and that can lead subsequently to a vitreous material 8 that is in the form of a coating layer that is robust and free of defects.

Advantageously, the method in accordance with the invention includes a step of gelling the sol deposited on said fraction of the glass wall 2. Such a gelling step is conventional in a sol-gel process. Preferably, gelling is performed by implementing the following reactions:

hydrolyzing the precursor (which is preferably provided with alkoxy groups and which preferably comprises silicon) in the presence of the water contained in the sol, thereby leading to the formation of silanol groups; and condensing said silanol groups (polymerization); said gelling step leading to a gel layer being obtained that covers said fraction of the inside face 20 of the glass wall 2.

Advantageously, said substances that are mixed together to obtain the sol also include a hydrolysis catalyst, and preferably an acid hydrolysis catalyst such as acetic acid. The presence of such a hydrolysis catalyst serves to facilitate and accelerate the hydrolysis reaction of the precursor, while making it possible to obtain a greater number of linear lattices that cross while forming the gel layer at the surface of the fraction of the glass wall 2.

Naturally, it is not essential to have recourse to an acid hydrolysis catalyst, and, for example, it is entirely possible to envisage having recourse to a basic hydrolysis catalyst.

In this preferred implementation, the step of gelling the sol thus takes place spontaneously, by the substances constituting said sol reacting progressively, and more precisely by catalyzed hydrolysis of the precursor. The sol thus forms a substance that is unstable and that spontaneously evolves towards a gel. In preferred manner, the composition of the sol is selected so that the sol remains liquid for a duration that is long enough to enable it to be applied industrially. For example, the sol may advantageously be designed to remain in the liquid state for several hours once it has been prepared.

By way of example, the precursor contained in the sol-gel may be a metal or a metalloid with reactive radicals (typically a mixture of alkoxysilanes) such as TEOS or MTEOS. Preferably, the precursor includes at least one organometallic compound, preferably an alcoholate.

Advantageously, the method includes a step of drying the gel layer obtained at the end of the gelling step and covering said fraction of the glass wall 2 by heating said gel layer under conditions that enable substantially all of the solvent to be extracted from the gel (which solvent is preferably an alcohol-based solvent), with the gel then transforming into said vitreous material 8, which is preferably a silica glass, or at least a silica-based glass, i.e. a vitreous material or a pseudo-vitreous material presenting characteristics that are substantially identical to the characteristics of a glass obtained by a conventional glass-making method by melting (fusion).

Advantageously, the drying step is performed in an oven having a system for renewing its atmosphere, e.g. a ventilation system, enabling the air in the oven enclosure to be renewed continuously, thereby removing the solvent extracted from the gel by heating.

Implementing this operation of positively extracting the solvent from the gel is advantageous since it makes it possible to avoid the solvent polluting the composition that is to be contained in the cavity 3.

Advantageously, the drying step includes a cycle of heating the container 1 to a temperature lying substantially in the range 60° C. to 300° C. Heating is performed in such a manner as to avoid any cracking of the vitreous material 8 that stems from the gel. For this purpose, it is important to adjust the drying time as a function of the heating temperature. For example, performing drying at 120° C. with ventilation for about twelve hours on a gel layer derived from a sol deposited at a mass per unit area of about 85 g/m$^2$ enables good results to be obtained. Advantageously, said vitreous material 8, at the end of the drying step, covers said fraction of the glass wall 2 at a mass per unit area that does not exceed substantially 70 g/m$^2$, and that preferably lies in the range substantially 30 g/m$^2$ to 60 g/m$^2$, and even more preferably in the range substantially 40 g/m$^2$ to 60 g/m$^2$, e.g. about 50 g/m$^2$.

Using a vitreous material 8 at such a mass per unit area makes it possible to obtain an excellent protective effect, and in particular to obtain a hydrolytic protection effect for the glass wall 2, while enabling remarkable appearance effects to be obtained, e.g. by including pigments that are dispersed in the vitreous material 8. The vitreous material 8 may thus present a color that is opaque, transparent, or translucent.

Advantageously, the drying step also makes it possible to bake the gel layer so as to harden it and the vitreous material 8 that stems therefrom.

The invention also provides as such a container 1 suitable for being obtained by the method in accordance with the invention as described above, and that is preferably obtained directly by the method in question. As explained above, the container 1 comprises a glass wall 2 defining a reception cavity 3 for a composition for administration to a human being or to an animal.

At least a fraction of said glass wall 2 is covered in a vitreous material, preferably a silica glass, or a glass based on silica, that is prepared using a sol-gel process.

Preferably, and as described, said glass wall 2 presents an inside face 20 situated facing the reception cavity 3, and an opposite, outside face 21, said fraction of the glass wall 2 that is covered by said material 8 forming part of the inside face 20. In other words, the vitreous material 8 obtained by the sol-gel process is deposited on the inside wall of the container 1, thus making it possible to improve the robustness of the container 1, and in particular its hydrolytic durability, and to confer remarkable functional and/or esthetic properties on the container 1. For this purpose, and as set out above, the vitreous material 8 advantageously incorporates within itself one or more functional substances selected from the following group: colorants (preferably inorganic or organic pigments); microbiocidal agents; and medicines.

In a preferred embodiment, the container 1 constitutes a bottle for receiving an alcohol-based liquid as a composition for administration, and preferably a body fragrance. In the context of such an application, having recourse to a vitreous material, of the silica glass type, and obtained using a sol-gel process, is particularly advantageous since it enables the strength of the glass bottle containing the fragrance to be improved while conferring a particularly attractive visual appearance on the bottle, e.g. by coloring the inside face 20 with the pigments, e.g. inorganic and/or organic pigments, that are incorporated in and dispersed throughout the vitreous material 8, which may then present a colored appearance that is opaque or that is transparent or indeed that is translucent. The glass wall 2 is itself preferably translucent or transparent, so that the vitreous material 8 is visible from outside the container 1.

Advantageously, the container is designed so that the vitreous material 8 is in contact, preferably direct contact, with the composition for administration.

Having recourse to a sol-gel process makes such contact possible, thus avoiding any need to coat the vitreous material 8 in a protective layer, insofar as the sol-gel process makes it possible to obtain an inorganic material that is amorphous, stable, and non-toxic, and that is therefore entirely suitable for being put into contact with a substance that is to be applied on or ingested by a living being.

As mentioned above, the vitreous material 8 is advantageously in the form of a layer covering said fraction of the inside face 20 at a mass per unit area that does not exceed substantially 70 g/m$^2$, and that preferably lies in the range substantially 30 g/m$^2$ to 60 g/m$^2$, more preferably in the range substantially 40 g/m$^2$ to 60 g/m$^2$, e.g. about 50 g/m$^2$. Using such a mass per unit area provides an excellent compromise between cost price, increasing the strength of the container 1, in particular its hydrolytic durability, and improving its esthetic appearance, while minimizing any risk of cracks appearing the sol-gel layer.

In an additional aspect that could constitute the subject matter of independent protection, the invention also provides a method of fabricating a one-piece container 1 (preferably a bottle having a neck), the container comprising a glass wall 2 defining a reception cavity 3 for receiving a composition for administration to a human being or to an animal, said glass wall 2 presenting an inside face 20 facing said reception cavity 3, said method including a step of covering at least a fraction of said inside face 20 in a vitreous material prepared using a sol-gel process, said vitreous material 8 preferably including organic or inorganic coloring pigments.

In another aspect suitable for constituting the subject matter of independent protection, the invention provides a method of fabricating a container 1 (preferably a bottle having a neck), the container comprising a glass wall 2 made of a glass having low or zero lead content (e.g. less than 20%, preferably less than 10%) defining a reception cavity 3 for receiving a composition for administration to a human being or to an animal, said glass wall 2 presenting an inside face 20 facing said reception cavity 3, said method including a step of covering at least a fraction of said inside face 20 in a vitreous material prepared using a sol-gel process, said vitreous material 8 preferably including organic or inorganic coloring pigments, and/or presenting a porous nature.

In yet another aspect suitable for forming the subject matter of independent protection, the invention provides a method of fabricating a container 1 (preferably a bottle having a neck), the container comprising a wall 2 made of glass (preferably having a low lead content) defining a reception cavity 3 for receiving a composition for administration to a human being or to an animal, said glass wall 2 presenting an inside face 20 facing said reception cavity 3 and an opposite, outside face 21, said method including a step of covering at least a fraction of said inside face 20, but not the outside face 21, in a vitreous material 8 prepared using a sol-gel process, said vitreous material 8 preferably including organic or inorganic coloring pigments, and/or presenting a porous nature, and/or covering said fraction of the inside face (20) with a mass per unit area does that not exceed substantially 70 g/m$^2$.

SUSCEPTIBILITY OF INDUSTRIAL APPLICATION

Industrial application of the invention lies in fabricating and ornamenting containers, such as bottles.

The invention claimed is:

1. A method of fabricating a container (1) comprising a glass wall (2) defining a reception cavity (3) for receiving a composition for administration to a human being or to an animal, said glass wall (2) presenting an inside face (20) situated facing said reception cavity (3), said method being characterized in that it comprises a step of covering at least a fraction of said inside face (20) in a vitreous material prepared using a sol-gel process so that said vitreous material (8) covers said fraction of the inside face (20) at a mass per unit area that does not exceed substantially 70 g/m$^2$.

2. A method according to claim 1, characterized in that said covering step is implemented while said fraction of the inside face (20) lies at a temperature in the range substantially 18° C. to 200° C., preferably at ambient temperature.

3. A method according to claim 1, characterized in that said vitreous material (8) is a silica-based glass.

4. A method according to claim 1, characterized in that said container is a bottle designed to receive an alcohol-based liquid, preferably a body fragrance.

5. A method according to claim 1, characterized in that said vitreous material (8) covers said fraction of the inside face (20) at a mass per unit area that lies in the range substantially 30 g/m2 to 60 g/m2.

6. A method according to claim 5, characterized in that said vitreous material (8) covers said fraction of the inside face (20) at a mass per unit area that lies in the range substantially 40 g/m$^2$ to 60 g/m$^2$.

7. A method according to claim 1, characterized in that, prior to said covering step, the method includes a step of preparing a substantially uniform and liquid sol by mixing together at least the following substances:
   a) a precursor having alkoxy groups;
   b) a solvent for said precursor, preferably an alcohol-based solvent; and
   c) water.

8. A method according to claim 7, characterized in that said substances mixed together to obtain said sol further comprise one or more functional substances selected from the following group: colorants, microbiocidal agents, medicines.

9. A method according to claim 8, characterized in that said colorants comprise inorganic pigments.

10. A method according to claim 7, characterized in that said substances mixed together to obtain said sol further comprise a hydrolysis catalyst, and preferably an acid hydrolysis catalyst such as acetic acid.

11. A method according to claim 7, characterized in that the precursor includes at least one organometallic compound, preferably an alcoholate.

12. A method according to claim 7, characterized in that the covering step includes an operation of depositing a layer of said sol on said fraction of said inside face (20) while said sol is in a substantially liquid state.

13. A method according to claim 12, characterized in that the deposition operation consists in depositing said sol layer directly on said fraction of said inside face (20).

14. A method according to claim 12, characterized in that the deposition operation is performed in such a manner as to deposit said layer of said sol on said fraction of the inside face (20) at a mass per unit area that does not exceed substantially 100 g/m$^2$, and that preferably lies in the range substantially 50 g/m$^2$ to 100 g/m$^2$, more preferably in the range substantially 70 g/m$^2$ to 90 g/m$^2$, e.g. about 85 g/m$^2$.

15. A method according to claim 12, characterized in that said deposition operation comprises spraying said sol onto said fraction of the inside face (20).

16. A method according to claim 7, characterized in that it includes a step of gelling the sol deposited on said fraction of the inside face (20), said gelling being performed by implementing the following reactions:
   a) hydrolyzing the precursor in the presence of the water that contains the sol, thereby leading to the formation of silanol groups; and
   b) condensing said silanol groups; said gelling step leading to a layer of gel being obtained that covers said fraction of the inside face (20).

17. A method according to claim 16, characterized in that it includes a step of drying said gel layer covering said fraction of the inside face (20) by heating said gel layer under conditions that enable substantially all of said solvent to be extracted from the gel, the gel then transforming into said vitreous material (8).

18. A method according to claim 17, characterized in that the drying step comprises a cycle of heating the container (1) to a temperature lying in the range substantially 60° C. to 300° C.

19. A method according to claim 7, characterized in that, prior to said covering step, it includes a step of activating said fraction of the inside face (20) in order to facilitate bonding of the sol with said fraction of the inside face (20).

20. A container (1) comprising a glass wall (2) defining a reception cavity (3) for receiving a composition for administration to a human being or to an animal, said glass wall (2) presenting an inside face (20) situated facing said reception cavity (3), the container being characterized in that at least a fraction of said inside face (20) is covered in a vitreous material (8) prepared using a sol-gel process, said vitreous material (8) covering said fraction of the inside face (20) at a mass per unit area that does not exceed substantially 70 g/m$^2$.

21. A container (1) according to claim 20, characterized in that it is designed so that said vitreous material (8) is in contact with said composition for administration.

22. A container (1) according to claim 20, characterized in that said glass wall (2) is translucent or transparent so that said vitreous material (8) is visible from outside the container (1).

23. A container (1) according to claim 20, characterized in that it constitutes a bottle for receiving as a composition to be administered an alcohol-based liquid, preferably a body fragrance.

24. A container (1) according to claim 20, characterized in that said vitreous material (8) covers said fraction of the inside face (20) at a mass per unit area that lies in the range substantially 30 g/m$^2$ to 60 g/m$^2$.

25. A container (1) according to claim 24, characterized in that said vitreous material (8) covers said fraction of the inside face (20) at a mass per unit area that lies in the range substantially 40 g/m$^2$ to 60 g/m$^2$.

26. A container (1) according to claim 20, characterized in that said vitreous material (8) is a silica-based glass.

27. A container (26) according to claim 26, characterized in that said vitreous material (8) includes organic chains.

28. A container (1) according to claim 20, characterized in that said vitreous material (8) includes within it one or more functional substances selected from the following group: colorants, microbiocidal agents, medicines.

29. A container (1) according to claim 28, characterized in that said vitreous material (8) includes within it organic and/or inorganic pigments.

* * * * *